United States Patent
Yang et al.

(10) Patent No.: US 6,690,431 B1
(45) Date of Patent: Feb. 10, 2004

(54) AUDIO/VIDEO AMPLIFIER WITH THE FUNCTION OF AUTOMATIC TURNING ON/OFF

(75) Inventors: Leon Yang, Guangzhou (CN); Kenneth Liu, Baishaling (CN)

(73) Assignee: MG International (Zhong Shan) Co., Ltd., Province (CN)

( * ) Notice: Subject to any disclaimer, the term of this patent is extended or adjusted under 35 U.S.C. 154(b) by 185 days.

(21) Appl. No.: 09/629,414

(22) Filed: Aug. 1, 2000

(30) Foreign Application Priority Data

Aug. 2, 1999 (CN) ........................ 99218992 U

(51) Int. Cl.[7] .................. H04N 5/268; H04N 5/46
(52) U.S. Cl. ............... 348/706; 348/707; 348/705; 348/730; 348/584
(58) Field of Search .................... 348/707, 705, 348/706, 730, 738, 722, 484, 485, 482, 584, 552, 515, 512; 381/120, 123, 28, 58

(56) References Cited

U.S. PATENT DOCUMENTS

| | | | | |
|---|---|---|---|---|
| 4,858,006 A | * | 8/1989 | Suzuki et al. ............... 348/189 |
| 5,170,159 A | * | 12/1992 | Kawabata et al. ...... 340/825.22 |
| 5,539,477 A | * | 7/1996 | Miyajima .................. 348/730 |
| 5,548,346 A | * | 8/1996 | Mimura et al. ............. 348/738 |
| 5,754,254 A | * | 5/1998 | Kobayashi et al. ......... 348/578 |
| 5,754,256 A | * | 5/1998 | Kim ........................... 348/706 |
| 5,838,393 A | * | 11/1998 | Simpson et al. ............ 348/705 |
| 5,917,557 A | * | 6/1999 | Toyoda ....................... 348/705 |
| 6,118,496 A | * | 9/2000 | Ho .............................. 348/706 |
| 6,122,018 A | * | 9/2000 | Sugihara et al. ............ 348/705 |
| 6,167,140 A | * | 12/2000 | Watanabe ................... 381/123 |
| 6,340,968 B1 | * | 1/2002 | Gu ............................. 345/211 |

* cited by examiner

*Primary Examiner*—Michael H. Lee
*Assistant Examiner*—Jean W. Désir
(74) *Attorney, Agent, or Firm*—Vedder Price Kaufman & Kammholz

(57) ABSTRACT

The invention provides an audio/video amplifier comprising an AV-signal receiver for receiving the signals from one or more program sources; a post-processing circuit connected with said AV-signal receiver for processing audio/video signals of said program source(s) or controlling the volume thereof; a microprocessor for controlling said AV-signal receiver and said post-processing circuit; an auxiliary power supply for powering said AV-signal receiver and said microprocessor; a main power supply controlled by the microprocessor for powering said post-processing circuit; and a signal identifying/comparing module arranged between said AV-signal receiver and said microprocessor for identifying and comparing input AV signals and outputting the result to the microprocessor.

8 Claims, 3 Drawing Sheets

AUDIO/VIDEO AMPLIFIER WITH THE FUNCTION OF AUTOMATIC TURNING ON/OFF

FIELD OF THE INVENTION

The invention relates to audio/video apparatus, in particular to an audio/video amplifier which is of the function of automatic turning on/off.

BACKGROUND OF THE INVENTION

Usually, the audio signals from various domestic AV source apparatus such as MD, LD, CD, VCD, PC, DVD, SVCD, SDDS7.1, AC-3, DTS5.1, etc. are very weak and need an audio/video (AV) amplifier to enhance the power of the electro-volume so as to actuate the speaker system. An AV amplifier, as a control unit, plays an important role in the speaker system and is definitely necessary. As shown in FIG. 1, a block diagram for representing the operation principle of a conventional AV amplifier it can be seen that the conventional AV amplifier includes an AV-signal receiver 1, a post-processing circuit 2 connected with the AV-signal receiver, a microprocessor 3, an auxiliary power supply 4 and a main power supply 5. Under the control of the microprocessor 3, various AV signals are received by the AV-signal receiver 1 and processed by the post-processing circuit 2. The resultant signals are then amplified and output. The post-processing circuit 2 generally comprises an audio/video process circuit or a volume control circuit. The microprocessor 3 is powered by the auxiliary power supply 4, and the AV-signal receiver 1 and the post-processing circuit 2 are powered by the main power supply 5. When broadcasting a program, one should firstly turn on the AV amplifier, namely, turning on the main power supply 5 in FIG. 1. The main power supply 5 may also be controlled by the microprocessor 3 through a remote controller. Existing AV amplifier does not possess the function of automatic turning on/off and needs to be operated manually. However, the audience often forgets to turn off the AV amplifier after enjoying the program. Although some home appliances like television, air-conditioner have adopted a timer to turn on/off the apparatus, they don't have an actual intelligent control system.

An object of the invention is to overcome the shortcoming existing in the prior art and to provide audio/video apparatus with the function of automatic turning on/off.

SUMMARY OF THE INVENTION

According to the invention, an audio/video amplifier with the function of automatic turning on/off comprising:
- an AV-signal receiver for receiving the signals from one or more program sources;
- a post-processing circuit connected with the AV-signal receiver for processing the audio/video signals or controlling the volume;
- a microprocessor for controlling the AV-signal receiver and the post-processing circuit;
- an auxiliary power supply for powering the AV signal receiver and the microprocessor;
- a main power supply for powering the post-processing circuit, and its turning on/off being controlled by the microprocessor;
- is characterized in that the amplifier further comprises a signal identifying/comparing module arranged between the AV signal receiver and the microprocessor for identifying and comparing input AV signals and outputting the result to the microprocessor.

Since the signal identifying/comparing module is arranged in the AV amplifier, the microprocessor may, according to the comparing result, automatically control the switch of the main power supply. In practice, the AV amplifier may intelligently turn on/off according to whether or not a signal is input without manual operation. If the signal source is turned on, the AV amplifier can be turned on automatically upon receiving a signal. If the signal source is turned off, the AV amplifier is automatically turned off accordingly. So, the present invention is highly practical in application.

PREFERRED EMBODIMENTS OF THE INVENTION

The present invention will be explained in detail by the following embodiments in connection with the drawings.

Embodiment 1

Figure 1:
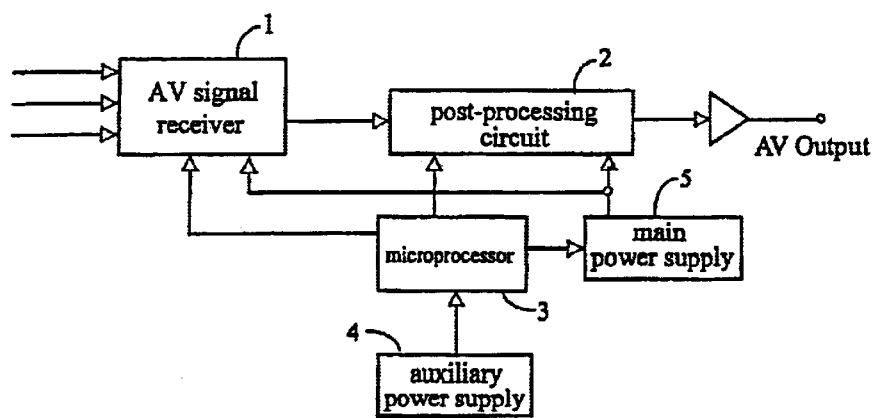
FIG. 1 is a block diagram showing the principle of the conventional AV amplifier.
Figure 2:
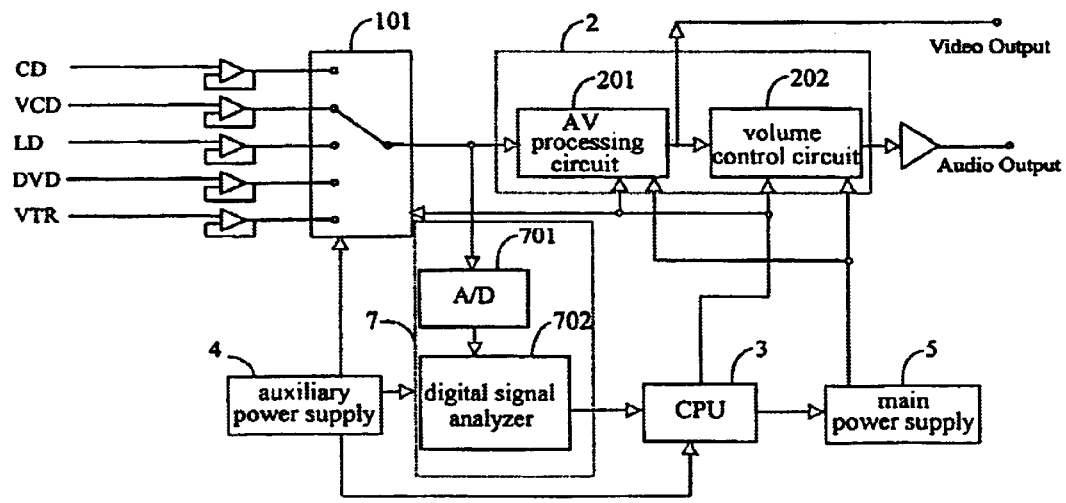
FIG. 2 is a block diagram showing the AV amplifier with the function of automatic turning on/off applying to the analog signal source according to the first embodiment of the present invention.

As shown in FIG. 2, it is an AV amplifier designed for the multi-channel AV signal sources. The electronic switch 101 is an AV signal receiver. A post processing circuit 2 includes an AV processing circuit 201 and a volume control circuit 202. A signal identifying/comparing module 7 is set between the electronic switch 101 and the microprocessor (CPU) 3 for controlling a main power supply 5. A signal identifying/comparing module 7 includes an analog/digital (A/D) converter 701 and a digital signal analyzer 702.

The electronic switch 101 continually scans the input channels of the multiple signal sources CD, VCD, LD, DVD and VTR. The A/D converter samples each signal obtained by the electronic switch 101, converts signals into digital signals and outputs the resulted signals to the digital signal analyzer 702. The analog signals from the electronic switch 101 are also directly provided to the AV processing circuit 201 and the volume control circuit 202 and then are amplified for outputting. The digital signal analyzer 702 analyzes and compares the sampled signals obtained by A/D converter and judges whether or not there are input signals. The judging result is input to the microprocessor 3. The microprocessor 3 controls the operation of the electronic switch 101 and the main power supply 5 in responding to the signals received from circuit 702. Due to small consumption of the power of the electronic switch 101 and the microprocessor 3, the auxiliary power supply 4 can drive them. The AV process circuit 201 and the volume control circuit 202 are powered by the main power supply 5.

The digital signal analyzer 702 adopts two ways to judge whether or not signals are outputting from the sources. One is to take an average value over each ten sampling values and compare two adjacent average values. If the difference between two average values is larger than an experimental threshold value, the digital signal analyzer 702 judges that signals are input. The threshold value is generally equal to 30. This is shown in the following example.

| Signal source | CD | VCD | LD | DVD | VTR |
| --- | --- | --- | --- | --- | --- |
| 1$^{st}$ average value | 20 | 30 | 25 | 30 | 33 |
| 2$^{nd}$ average value | 28 | 35 | 30 | 28 | 30 |
| 3$^{rd}$ average value | 27 | 25 | 29 | 35 | 36 |
| 4$^{th}$ average value | 31 | 70 | 34 | 32 | 30 |

From the above, the 4th average value is 70 and the 3rd is 25 for the signal source VCD. The difference between them is 45, which is larger than the set threshold value 30. That means that the amount of data from the VCD signal channel has a considerable change. In this case, the digital signal analyzer 702 judges the VCD is outputting signals.

The other manner is to take an average value over each ten sampling values. If all of the adjacent five average values are larger than an experimental threshold value, the digital signal analyzer 702 judges that there are input AV signals from the sources. The threshold value takes generally 1/20–1/10 of the dynamic sampling range of the A/D converter. In this embodiment, the threshold value is 50. This is shown in the following example.

| Signal source | CD | VCD | LD | DVD | VTR |
| --- | --- | --- | --- | --- | --- |
| 1$^{st}$ average value | 20 | 30 | 25 | 30 | 33 |
| 2$^{nd}$ average value | 28 | 35 | 30 | 28 | 30 |
| 3$^{rd}$ average value | 27 | 25 | 29 | 35 | 36 |
| 4$^{th}$ average value | 31 | 70 | 34 | 32 | 30 |
| 5$^{th}$ average value | 32 | 72 | 33 | 31 | 26 |
| 6$^{th}$ average value | 28 | 76 | 30 | 29 | 27 |
| 7$^{th}$ average value | 26 | 80 | 28 | 27 | 25 |
| 8$^{th}$ average value | 29 | 85 | 31 | 30 | 28 |

From the above table, the adjacent 4th –8th average values of the VCD source are 70, 72, 76, 80, 85 respectively, which are larger than the set threshold value 50. That means that the amount of data from the VCD signal channel is continually increased, which is impossible to be caused by noise. In this case, the digital signal analyzer 702 can judge that VCD is outputting signals.

According to the above judgement, the digital signal analyzer 702 sends a signal to the microprocessor 3. In response to the receiving of the signal from the circuit 702, the microprocessor 3 controls the electronic switch 101 to lock in the VCD channel, as showing in FIG. 2. The microprocessor 3 outputs simultaneously a control signal to turn on the main power supply 5. The main power supply 5 outputs a DC high voltage or a low voltage for driving corresponding circuits. The system is in the mode of VCD.

In consideration of the influence of any sudden noise, one can remove the highest sampled value and the lowest sampled value and then take the average value for the rest eight sampled values.

When the VCD is turned off, no signal from VCD signal channel is output. In this case, the sampling values from the A/D converter are lower than the set threshold value. The microprocessor 3 begins to count the lapsing time. If three minutes lapse and the sampling values are still lower than the threshold value, the microprocessor 3 starts the screen-protection program. If ten minutes lapse and no signal is output from the source (the sampling values are still lower than the threshold value), the microprocessor 3 outputs a control signal to turn off the main power supply 5. Without power from the main power supply 5, all circuits of the entire system stop working and standby. The microprocessor 3 is in the condition of sleeping for eliminating the consumption of the power. The microprocessor 3 can be waked up timely for detecting whether there are inputting signals. The function of waking up may be performed by a timer arranged in the microprocessor 3.

The electronic switch 101, signal identifying/comparing process circuit 7 and microprocessor 3 are powered by the auxiliary power supply 4. The auxiliary power supply 4 does not affect the power amplifier.

Figure 3:
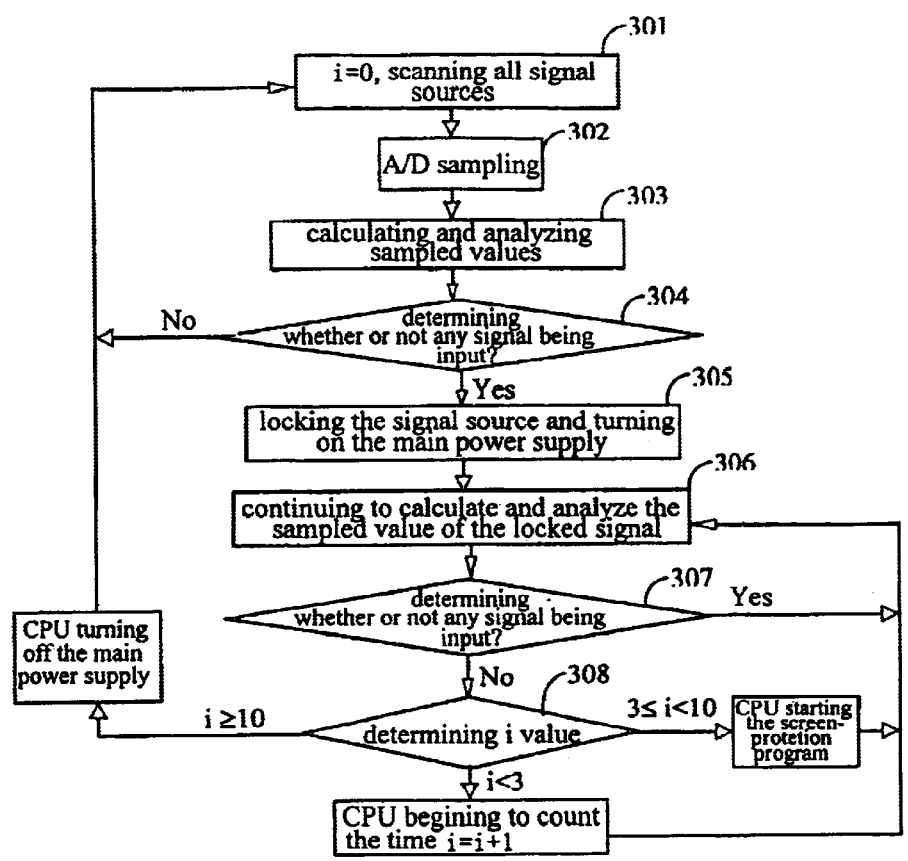
FIG. 3 is a flow diagram showing the operation of the AV amplifier of FIG. 2.

FIG. 3 describes the operation of the embodiment. In step 301, the timer is initiated, setting i=0. The electronic switch 101 scans all signal channels of the signal sources (CD, VCD, LD, DVD, VTR); in step 302, the A/D converter samples the signals from the electronic switch 101 and converts them into digital signals for analyzing; in step 303, the digital signal analyzer calculates the sampling values; in step 304, the digital signal analyzer judges whether or not any signal is input from one of the signal channels according to the result calculated in step 303; if no inputting signal, the program returns to step 301; otherwise, the program proceeds to step 305; in step 305, the microprocessor controls the electronic switch to lock in the signal source which is outputting signals and turns on the main power supply; in step 306, the digital signal analyzer still calculates the sampled values; in step 307, the digital signal analyzer judges whether or not any signal is input from one of the signal channels according to the result calculated in step 306; if no inputting signal, the program returns to step 306; otherwise, the program proceeds to step 308; and in step 308, in i<3, the microprocessor begins to count the time. During the period of i=i+1, the program returns to step 306; if 3<i<10, the microprocessor starts the screen-protection program and the system returns to step 306; if i>10, the microprocessor turns off the main power supply and the system returns to step 301.

Regarding the determination of the threshold value and the timing, it permits one skilled in the art to make a selection or modification without deviating from the spirit of the invention. The embodiment provided herein is not meant to limit the invention.

Embodiment 2

Figure 4:
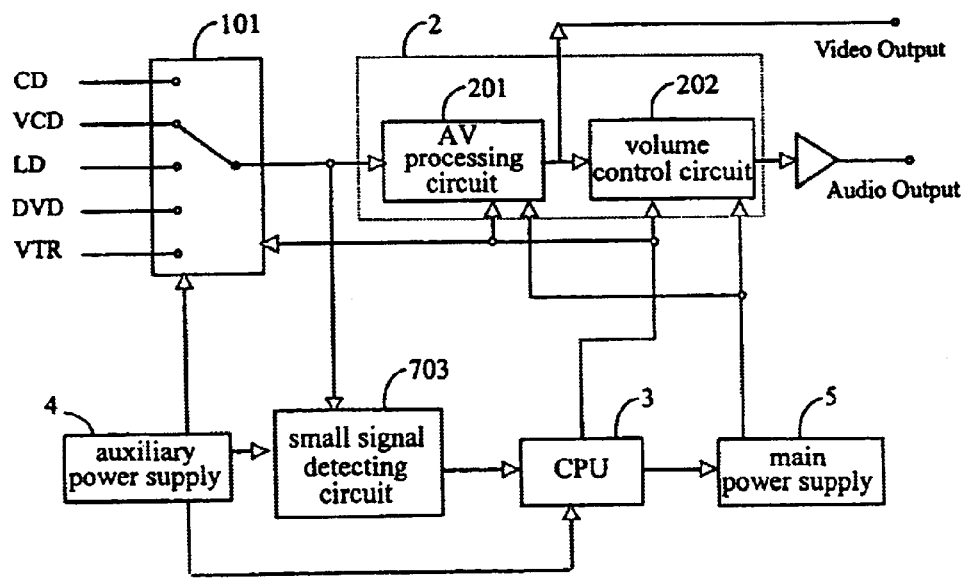
FIG. 4 is a block diagram showing the AV amplifier with the function of automatic turning on/off applied to the analog signal source according to the second embodiment of the present invention.
Figure 5:
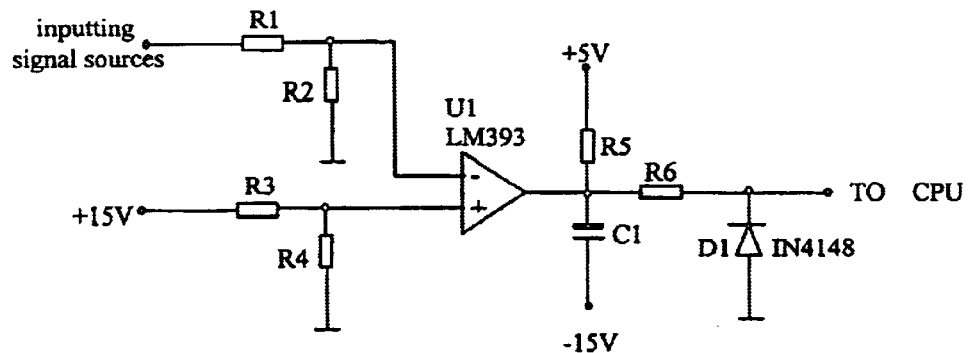
FIG. 5 is a diagram in a circuit for detecting small signals.

As shown in FIG. 4, the AV amplifier in the embodiment is also designed for the multi-channel analog signal sources. Compared with Embodiment 1, which uses to identify the AV signal sources, the present embodiment uses hardware to identify the AV signal sources. A small signal detecting circuit 703 is used for identifying and comparing signals. There are a lot of configurations for the circuit 703. FIG. 5 shows one of the configurations, which consists of a comparator and diodes. The signals from signal sources are input to the reverse input of the comparator U1. Another input of the comparator U1 is connected with voltage-dividing resistances R3 and R4. The circuit is used for detecting such input signals whose amplitude is larger than a threshold value and outputting a low (high) level. When no signal is detected, or the detected signals are lower than the threshold value, the circuit outputs a high (low) level. The CPU can, according to the change of the level, determine whether or not signals are inputting. The small signal detecting circuit should not be too sensitive. If the sensitivity of the circuit is too high, the circuit may make an erroneous judgement resulting from the noise. If the sensitivity is too low, the circuit may miss some signals. Since the amplitude of signals of music is generally larger than 1 $mV_{RMS}$, the threshold value of the embodiment is set in a range of 1.0–1.5 $mV_{RMS}$.

The operation of the embodiment is as follows:

In this embodiment, it is presumed that, when signals from a source are output, the small signal detecting circuit 703 will output a low level. At first, AV amplifier is in condition of standby. The CPU controls the switch 101 to connect with one of the signal sources (for example, CD) and detects the output signal of the circuit 703 with a delay. If the output signal is high in level, it means that no signal is output from the signal source. In this case, the switch 101 is switched to the next source. If the output signal is low in level, the CPU detects again the output of the circuit 703 with a delay. If the output of the circuit 703 is still low in level, the CPU determines that signals are output from the source and transmits an instruction to turn on the amplifier. The CPU repeats the operation of the detection and the determination until the output of the circuit 703 becomes high in level, which means that the signals are no longer output from the source. When the output of circuit 703 is in high level for more than ten minutes, it means that no signal is output from the source for a long time. In the case, the CPU turns off the main power supply and the AV amplifier is returned to the condition of standby.

Embodiment 3

Embodiments 1 and 2 are applied to analog signal sources. As the development of the technology, it is a trend that AV apparatus adopts digital signal sources. For example, LD, DVD, CD, SACD and MD are equipped digital optic fiber output or digital cable output.

Figure 6:
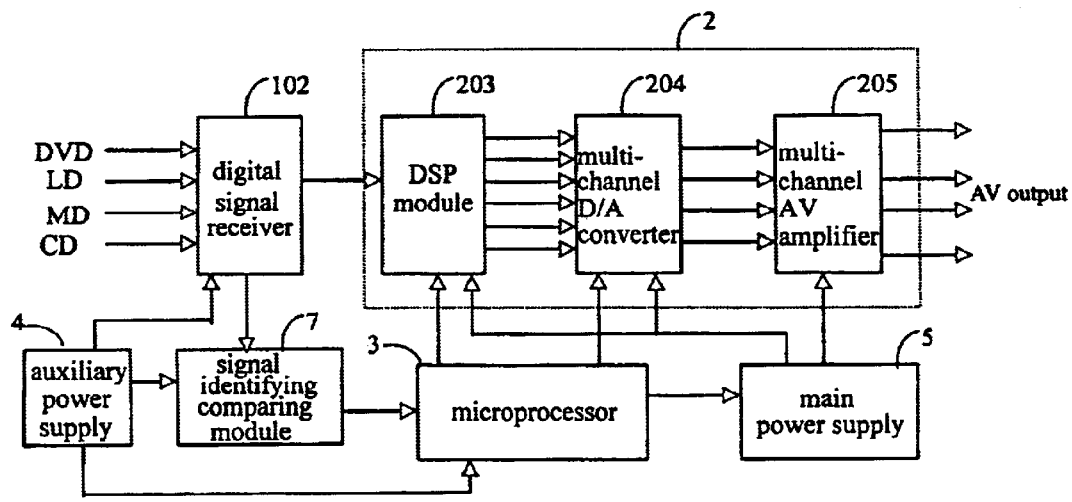
FIG. 6 is a block diagram showing the AV amplifier with the function of automatic turning on/off applied to the digital signal source according to the third embodiment of the present invention.

FIG. 6 represents apparatus according to the invention, which is applied to digital signal sources. The digital signal receiver 102 is an AV signal receiver. Generally, a digital signal receiver is provided with an electronic switch. The post-process circuit 2 comprises a DSP module 203, a multi-channel D/A converter 204 and a multi-channel AV amplifier 205. Several digital signal sources LD, DVD, CD and MD are connected with the digital signal receiver 102 through optic fiber or cable. The digital signal receiver 102 transmits the received digital signals to the DSP (digital signal process) module 203 and then to the multi-channel D/A converter 204 for converting the received digital signals into analog signals. The converted signals are transmitted to the multi-channel AV amplifier 205. According to the various formats of the digital signals, the digital signal receiver 102 can produce various format-identifying signals and provide them to the signal identifying/comparing module 7. For example, if the input signals are CD signals, the format-identifying signal is a linear PCM. If the input signals are DVD multi-channel audio-visual signals, the format-identifying signal is a compressed PCM. According to the format-identifying signal from the receiver 102, the signal identifying/comparing module 7 outputs the corresponding identifying signal to the microprocessor 3, which may control the turning on/off of the main power supply 5 and the corresponding operation of the DPS, D/A conversion.

For instance, when a user turns on a digital CD player, the digital signal receiver 102 generates a PCM format-identifying signal and transmits it to the microprocessor 3. Upon receiving it, the microprocessor 3 controls the receiver 102 to lock in the CD channel. The main power supply 5 is turned on under the control of the microprocessor 3 and supplies the power to the DSP module 203, the multi-channel D/A converter 204 and the multi-channel AV amplifier 205. The operations of the DSP module 203 and the multi-channel D/A converter 204 are under the control of the microprocessor 3. The digital signal receiver 102, signal identifying/comparing module 7 and the microprocessor 3 are powered by the auxiliary power supply 4.

When the user turns off the CD player, no signal is output. The receiver 102 receives no signal. In this case, the microprocessor 3 begins to count the time. If no signal is received for three minutes, the microprocessor 3 starts the screen-protection program. If no signal is received for ten minutes, the microprocessor 3 sends a control signal to turn off the main power supply. The AV amplifier is in the condition of standby and the microprocessor is in the condition of sleeping. The microprocessor 3 will be waked up timely for detecting whether or not signals are inputting. A timer in the microprocessor can realize the function.

From the above, the turning on/off of AV apparatus may be controlled by a microprocessor in real time. It is not necessary to operate it manually. While the preferred embodiment of the invention have been shown and described, it will be apparent to those skilled in the art that changes and modifications may be made therein without departing from the spirit of the invention, the scope of which is defined by the appended claims.

What we claim is:

1. An audio/video amplifier comprising:
    an AV-signal receiver for receiving the signals from one or more program sources;
    a post-processing circuit connected with said AV-signal receiver for processing audio/video signals of said program source(s) or controlling the volume thereof;
    a microprocessor for controlling said AV-signal receiver and said post-processing circuit;
    an auxiliary power supply for powering said AV-signal receiver and said microprocessor;
    a main power supply controlled by the microprocessor for powering said post-processing circuit; and
    a signal identifying/comparing module arranged between said AV-signal receiver and said microprocessor for identifying and comparing input AV signals and outputting the result to the microprocessor.

2. The audio/video amplifier according to claim 1, wherein said AV-signal receiver is an electronic switch for scanning input channels of the multiple signal sources and for locking a channel via said microprocessor.

3. The audio/video amplifier according to claim 1, wherein said signal identifying/comparing module comprises an A/D converter and a digital signal analyzer.

4. The audio/video amplifier according to claim 2, wherein said signal identifying/comparing module comprises and A/D converter and a digital signal analyzer.

5. The audio/video amplifier according to claim 1, wherein said signal identifying/comparing module is a small signal detecting circuit for detecting signals more than a threshold value and outputting a high (low) level.

6. The audio/video amplifier according to claim 2, wherein said signal identifying/comparing module is a small signal detecting circuit for detecting signals more than a threshold value and outputting a high (low) level.

7. The audio/video amplifier according to claim 1, wherein said AV-signal receiver is a digital signal receiver for generating format-identifying signals to the signal identifying/comparing module.

8. The audio/video amplifier according to claim 2, wherein said AV-signal receiver is a digital signal receiver for generating format-identifying signals to the signal identifying/comparing module.

* * * * *

UNITED STATES PATENT AND TRADEMARK OFFICE
CERTIFICATE OF CORRECTION

PATENT NO. : 6,690,431 B1
DATED : February 10, 2004
INVENTOR(S) : Leon Yang and Kenneth Liu It is certified that error appears in the above-identified patent and that said Letters Patent is hereby corrected as shown below:

<u>Title page,</u>
Item [75], Inventors, should read -- Leon Yang, Guangzhou (CN); Kenneth Liu, Guangzhou (CN) --
Item [73], Assignee, should read -- MG International (Zhong Shan) Co., Ltd., Guangdong Province (CN) --

Signed and Sealed this

Twenty-fifth Day of May, 2004

JON W. DUDAS
*Acting Director of the United States Patent and Trademark Office*